Sept. 30, 1947  M. MAYES  2,428,031
PISTON AND SEALING RING THEREFOR
Filed March 31, 1944

INVENTOR
MARTIN MAYES
BY Alfred R. Fadke
ATTORNEY

Patented Sept. 30, 1947

2,428,031

UNITED STATES PATENT OFFICE 2,428,031

PISTON AND SEALING RING THEREFOR

Martin Mayes, Richmond, Mo.

Application March 31, 1944, Serial No. 528,923

7 Claims. (Cl. 309—44)

My invention relates to sealing rings, and more particularly to piston rings for internal combustion engines.

In an internal combustion engine ordinarily there is a plurality of piston rings provided to seal the sliding joint between the piston and the cylinder wall, said sealing rings, or piston rings, being mounted in annular grooves in the piston. There is a tendency for carbon to accumulate on said rings and in said grooves, which interferes with the proper sealing function of said rings, causing leakage past the same, reducing the efficiency of the engine in which the piston is operating.

It is a purpose of my invention to prevent the accumulation of carbon on the piston rings and in the grooves in the piston in which said rings are mounted. This is accomplished by providing means for creating a rotative movement of said rings in the grooves, which tends to keep all surfaces of the rings, as well as the walls of the grooves, clear of carbon.

In order that the rings will have a positive rotational movement in the grooves, always in the same direction, it is necessary to provide positive means for driving said rings so as to assure such rotative movement, in view of the fact that said rings are always made of spring material and grip the cylinder walls with a spring pressure, creating considerable friction, tending to resist such rotative movement.

I have found that it is necessary, in order to assure such rotative movement as well keep the surfaces of the rings and the walls of the grooves substantially clear of carbon, that said rings must be provided with a plurality of pockets, which act substantially in the same manner as the blades or buckets of a turbine, when compressed fluid, such as the gases compressed in the engine cylinders, enters the same. In order to provide such an action similar to that of a turbine or other member having vanes for rotating the same, I provide an annular series of substantially equidistantly spaced pockets in the upper face of each of said rings, or that face directed toward the cylinder space in which the gases, or other fluids, are compressed, said pockets being so shaped that the compressed fluid entering the same will cause said rings to rotate, the effect of said fluid on said pockets providing forces that all tend to rotate the ring in the same direction. The above referred to pockets are, preferably, provided at the annular corner portion of the ring between the curved outer face thereof and the one flat or plane face thereof, and are each of gradually increasing depth from one end to the other end thereof, the first end terminating flush with the plane or flat face of the ring, and the other end thereof terminating in an abutment, or wall, intersecting the flat face of the ring substantially at right angles.

It is a further purpose of my invention to provide means for supplying and directing streams of the fluid under pressure to said pockets, including passages through portions of the walls of said cylinders leading to said grooves from the space defined between the cylinder walls and the piston, said passages being of either a uniform bore from end to end thereof, or gradually decreasing in cross section from the entrance to the discharge end thereof.

Other objects and advantages of my invention will appear as the description of the drawings proceeds. I desire to have it understood, however, that I do not intend to limit myself to the particular details shown or described, except as defined in the claims.

Figure 3:
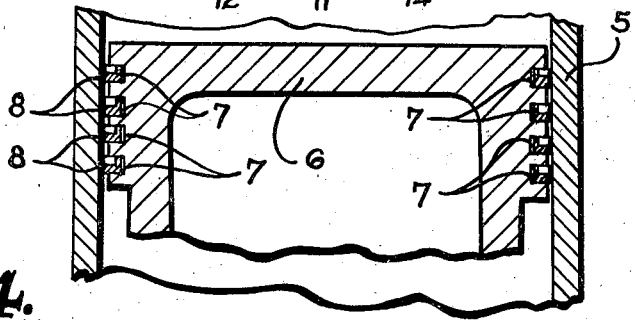
Figure 4:
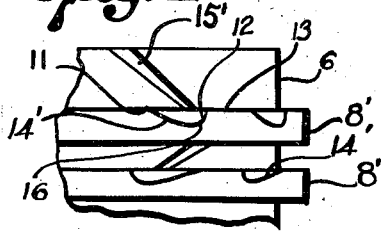
Figure 5:
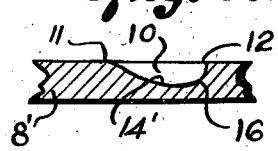

Fig. 3 is a fragmentary sectional view through the engine cylinder and the piston provided with my improved sealing rings, the usual water jacket and other parts of the engine of no importance to this invention being omitted, and Fig. 4 is a fragmentary elevational view of a portion of a piston and sealing rings, showing a modification of my invention, and Fig. 5 is a fragmentary section on an enlarged scale.

Referring in detail to the drawings, in Fig. 3 is shown a portion of a cylinder wall 5, and a fragmentary portion of a piston 6. Said piston is provided with a plurality of annular grooves 7 in the side wall thereof, in which are mounted the piston rings 8, said piston rings being of a generally circular character when in the engine cylinder, but having a tendency to spring into a position having a somewhat larger radius of curvature than that of the cylinder bore. In order to permit of the resilient gripping action of the piston rings against the cylinder wall, the same are made split, as is customary, and any desired form of joint at the split therein may be provided, the ends of the ring being shown as beveled, or tapered, to provide an overlapping joint, although any other customary form of overlapping joint may be provided, said joint being indicated in Fig. 2 at 9.

Each of said rings is provided with a series of pockets, cups or recesses 10 therein. The number of such pockets or recesses provided and the spacing thereof shown in the drawings is only illustrative of the invention, as the number can be either increased above or decreased below that shown, dependent upon the number thereof that may be found to be the most desirable to get the desired rate of rotation of the piston ring 8 without obtaining excessive rotation thereof. As will be obvious from Fig. 1, said pockets are, preferably, of the same width from end to end thereof, but are of gradually increasing depth from the end 11 of each thereof to the end 12 of each thereof. This is clearly apparent from Fig. 2, the ends 11 of said pockets 10 merging with the flat top face 13 of each of said sealing rings, and the ends 12 thereof providing an abutment or wall, the major portion of which is substantially perpendicular to the face 13 of the ring, the bottom wall 14 of each pocket inclining gradually from the end 11 thereof to the end 12 thereof, and the wall 14 connecting with the wall at the end 12 by means of a curved wall portion, as shown in Fig. 2.

Figure 1:
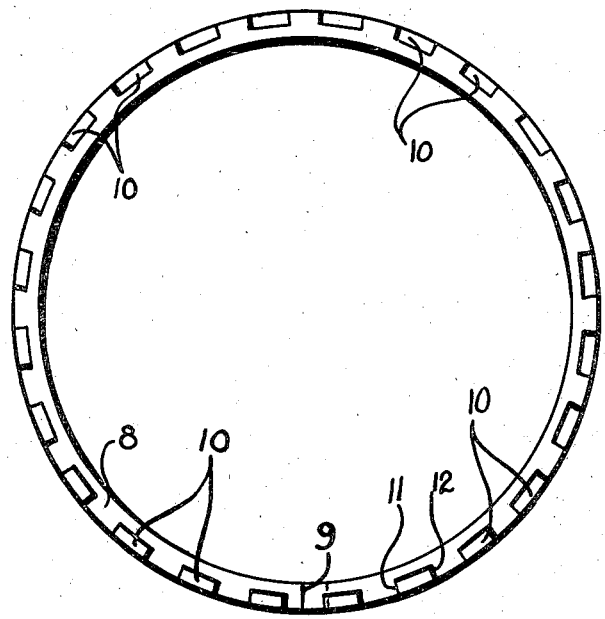
Fig. 1 is a top plan view of one of my improved piston rings, showing the same in substantially the position that it would assume when in the engine cylinder.
Figure 2:
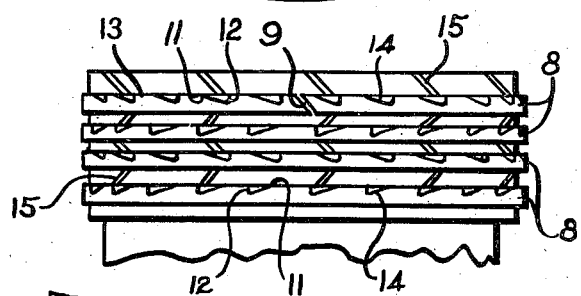
Fig. 2 is a fragmentary side elevational view of a piston, showing my improved piston rings in position in the grooves thereof.

It will be obvious that as pressure is created in the cylinder, due to either the explosion of the charge therein, or due to the compressing action of the piston in moving toward the head end of the cylinder, the compressed gases or fluids in the cylinder space of the engine, or similar device, defined by the piston and cylinder walls, will cause streams thereof to enter said pockets and the forces acting on the abutments, or end walls, at the ends 12 of all said pockets, will exert a force acting in the same direction about the axial center of the ring to cause rotation thereof in a predetermined direction, the direction of rotation being counter-clockwise as the ring is viewed in Fig. 1.

While ordinarily sufficient of the compressed fluid will enter the pockets through the space that exists between the cylinder wall and the piston, in order to assure a sufficient feed of the compressed fluid to the pockets, in case the grooves 7 are of such depth and the fit of the piston in the cylinder is such that the compressed fluid will not be fed sufficiently to the pockets 10, passages 15 may be provided in the rib portions defined by the grooves 7 in the piston, so located that these will feed the compressed fluid into the pockets and cause sufficient of said fluid to be fed into said pockets to rotate the sealing rings 8. In Fig. 2 these passages 15 are shown as being of uniform width from end to end thereof, being merely grooves cut in the annular or cylindrical surfaces of the rib portions between the grooves 7.

However, if found desirable, the grooves may be tapered as shown in Fig. 4 at 15'. It will be noted that the bottom walls 14' instead of being substantially planar, as shown in Fig. 2, are curved on a gradual curve, which as shown is substantially parabolic and terminates in a more sharply curved portion 16 joining it with the end wall of the pocket intersecting the face 13 of the ring substantially at right angles, the shape of the cups thus provided being more clearly shown in Fig. 5. The other parts of the device shown in Fig. 4 are the same as shown in the other figures of the drawings and bear the same reference numerals. The grooves 15' tapering toward the ends thereof at which the compressed fluid is discharged into the pockets or recesses 10, will have the action of a nozzle tending to discharge the compressed fluid at considerable velocity into the pockets or cups in the piston rings or sealing rings, tending to aid in producing such rotative movement. The particular number and inclination of the grooves and exact shape of the pockets or cups may be varied, dependent upon the location of the rings, to get the desired rotation thereof.

Obviously the sealing action of the rings 8 in co-operation with the wall of the cylinder 5 will reduce the pressure that is effective in the pockets of the rings the further these are from the cylinder chamber. The ring nearest the head end of the piston, or that end facing the cylinder chamber, will accordingly have the greatest amount of rotation. This is very desirable, as the tendency would also be for more carbon to tend to collect on the first ring and in the first groove, than in those further away from the combustion in the cylinder.

It will be noted upon reference to Fig. 2 that the alternating rings shown therein have the pockets so arranged that the abutment ends of the pockets of adjacent rings are opposed to each other, so that the adjacent rings will be rotated in the opposite directions, due to the forces exerted thereon by the compressed fluids or gases entering said pockets, and that the passages 15 are also arranged to extend diagonally in opposite directions, said passages 15 being always so arranged that the fluid passing therethrough will tend to impinge against the abutment or end wall at the deep end of the pocket of the particular ring with which the particular passage cooperates. While such an arrangement is shown and is preferable, obviously all of the rings could rotate in the same direction and all of the passages 15 could be inclined in the same direction, if this should be found to be desirable. The action of the rings in their sealing of the sliding joint between the piston and the cylinder and in preventing accumulation of carbon deposits on the rings and in the grooves will be the same no matter what the direction of rotation is, as long as it is positive and occurs with each compression and expansion stroke of the engine. It will be obvious that a positive driving means is provided for each ring by the annular series of pockets provided in said rings, and that these will act substantially as buckets or vanes of a turbine to produce such rotation of said rings. Also it will be noted that it may be desirable to provide more of such pockets or recesses in the rings that are spaced the furthest from the head end of the piston in order to assure rotation thereof, due to the fact that the pressure of the fluid entering said pockets will be considerably lower than that entering the pockets of the rings nearest the head end of the piston.

What I claim is:

1. The combination with an internal combustion engine cylinder and a piston operating therein to define the cylinder chamber of said engine, said piston having a groove therein defining a rib between said chamber and said groove, said rib having passages therein extending into said groove, of a sealing ring mounted in said groove, said sealing ring having a plurality of recesses in the face thereof toward the cylinder chamber, said passages extending to direct compressed fluid discharged therefrom obliquely into said pockets and said pockets being shaped so that compressed fluid discharged from said passages engaging the walls of said recesses will rotate said ring in said groove.

2. The combination with an internal combustion engine cylinder and a piston operating therein to define the cylinder chamber of said engine, said piston having a plurality of spaced annular grooves therein, defining annular ribs between said grooves, said ribs having passages therein extending into said grooves, of a sealing ring mounted in each of said grooves, said sealing rings each having a plurality of recesses in the face thereof toward the cylinder chamber, said passages extending to direct compressed fluid discharged therefrom obliquely into said pockets and said pockets being shaped so that compressed fluid discharged from said passages engaging the walls of said recesses will rotate said ring in said groove.

3. The combination with an internal combustion engine cylinder and a piston operating therein to define the cylinder chamber of said engine, said piston having a plurality of spaced annular grooves therein, defining annular ribs between said grooves, said ribs having passages therein extending into said grooves, of a sealing ring mounted in each of said grooves, said sealing rings each having an annular series of substantially equidistantly spaced recesses in the face thereof toward the cylinder chamber, said passages extending to direct compressed fluid discharged therefrom obliquely into said pockets and said pockets being shaped so that compressed fluid discharged from said passages engaging the walls of said recesses will rotate said ring in said groove.

4. The combination with an internal combustion engine cylinder and a piston operating therein to define the cylinder chamber of said engine, said piston having a plurality of spaced annular grooves therein, defining annular ribs between said grooves, said ribs having oblique passages therein extending into said grooves, of a sealing ring mounted in each of said grooves, said sealing rings each having a series of pockets in a face thereof aligning with said passages, said pockets each gradually increasing in depth from one end thereof merging with said face to the other end thereof forming an abutment terminating substantially perpendicularly to said face.

5. The combination with an internal combustion engine cylinder and a piston operating therein to define the cylinder chamber of said engine, said piston having a plurality of spaced annular grooves therein, defining annular ribs between said grooves, said ribs having oblique passages therein extending into said grooves, of a sealing ring mounted in each of said grooves, said sealing rings each having a series of pockets in a face thereof aligning with said passages, said pockets each gradually increasing in depth from one end thereof merging with said face to the other end thereof forming an abutment substantially perpendicular to said face, said pockets all having the abutments at the corresponding ends thereof.

6. The combination with an internal combustion engine cylinder and a piston operating therein to define the cylinder chamber of said engine, said piston having a plurality of spaced annular grooves therein, defining annular ribs between said grooves, said ribs having oblique passages of uniform cross section from end to end thereof extending into said grooves, of a sealing ring mounted in each of said grooves, said sealing rings each having a series of pockets in a face thereof aligning with said passages, said pockets each gradually increasing in depth from one end thereof merging with said face to the other end thereof forming an abutment substantially perpendicular to said face, said pockets all having the abutments at the corresponding ends thereof.

7. The combination with an internal combustion engine cylinder and a piston operating therein to define the cylinder chamber of said engine, said piston having a plurality of spaced annular grooves therein, defining annular ribs between said grooves, said ribs having oblique passages therein extending into and tapering toward said grooves, of a sealing ring mounted in each of said grooves, said sealing rings each having a series of pockets in a face thereof aligning with said passages, said pockets each gradually increasing in depth from one end thereof merging with said face to the other end thereof forming an abutment substantially perpendicular to said face, said pockets all having the abutments at the corresponding ends thereof.

MARTIN MAYES.

REFERENCES CITED

The following references are of record in the file of this patent:

UNITED STATES PATENTS

| Number | Name | Date |
|---|---|---|
| 1,644,944 | Panyard | Oct. 11, 1927 |
| 1,586,575 | Panyard | June 1, 1926 |
| 2,044,273 | Zahodiakin | June 16, 1936 |
| 1,499,571 | Davis | July 1, 1924 |

FOREIGN PATENTS

| Number | Country | Date |
|---|---|---|
| 390,610 | England | Apr. 13, 1933 |

OTHER REFERENCES

"American Inventor," April 1906, volume 15, No. 4, page 101, published at 114 Liberty Street, New York, N. Y. (Copy available in Division 18, United States Patent Office.)